W. E. DEES.
BALING PRESS.
APPLICATION FILED FEB. 7, 1916.
1,217,921. Patented Mar. 6, 1917.
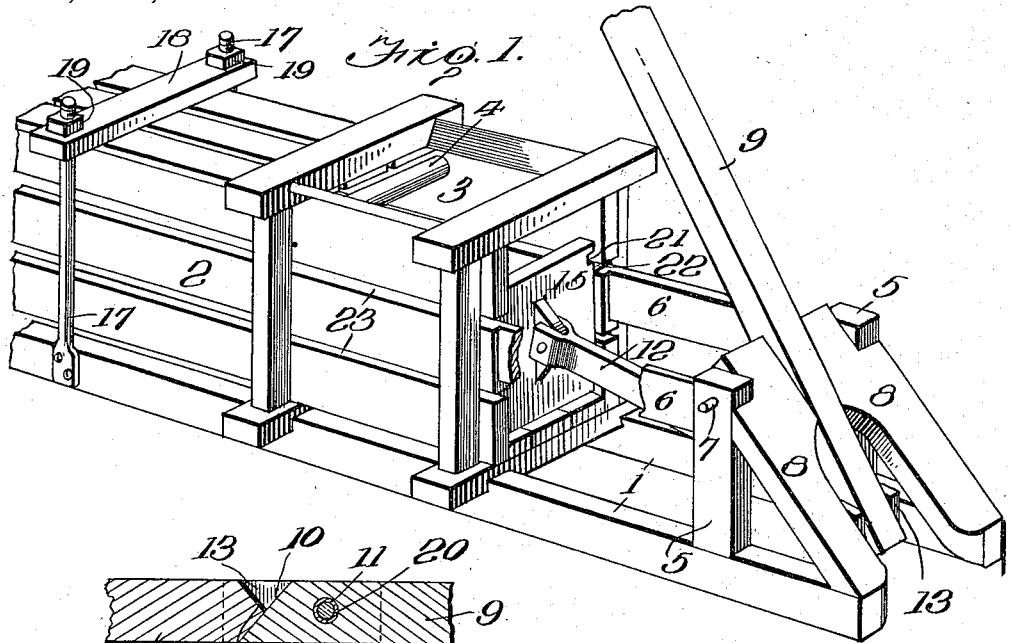
Fig. 1.
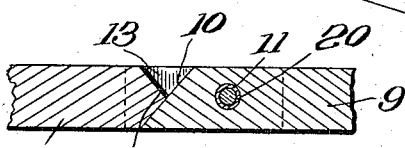
Fig. 3.
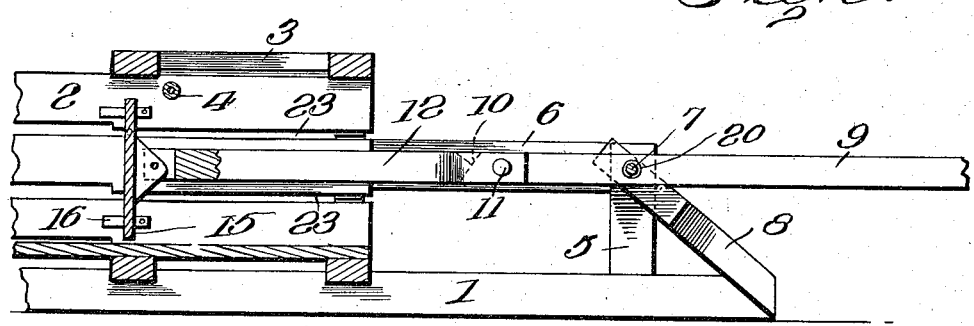
Fig. 2.
Fig. 4.
Inventor
W. E. Dees.
By
, Attorneys

UNITED STATES PATENT OFFICE.

WILLIAM E. DEES, OF COLLINS, MISSISSIPPI.

BALING-PRESS.

1,217,921.  Specification of Letters Patent.  Patented Mar. 6, 1917.

Application filed February 7, 1916. Serial No. 76,703.

*To all whom it may concern:*

Be it known that I, WILLIAM E. DEES, a citizen of the United States, residing at Collins, in the county of Covington and State of Mississippi, have invented certain new and useful Improvements in Baling-Presses, of which the following is a specification.

This invention relates to baling presses and has for its object the provision of means whereby the plunger or presser block will be automatically stopped at the limit of its movement in either direction. A further object of the invention is to provide a baling press of simple construction in which the loose hay will be prevented from choking the movement of the plunger or presser block.

The invention is illustrated in the accompanying drawings and will be hereinafter fully described, the novel features being subsequently pointed out in the claims following the description.

In the annexed drawings:

Figure 1 is a perspective view of a press embodying my invention;

Fig. 2 is a longitudinal vertical section of the same;

Fig. 3 is an enlarged detail section showing the connection between the pitman and the operating lever;

Fig. 4 is a detail view of the presser block.

In carrying out my invention, I employ sills 1 upon which the baling chamber or box 2 is built in the usual manner, said baling box having a feed-opening 3 provided in its top at one end, as will be readily understood. In the side walls of the box, I journal a roller 4 which extends between the said side walls immediately adjacent the rear edge of the feed-opening 3 so that, when the plunger moves across the receiving chamber to compress the loose hay and drive the same into the baling box, the roller will yield to the movement of the hay and rotate so that the hay or straw will not catch against the rear wall of the feed-opening and tend to bind therein so as to choke the movement of the plunger. It will be understood that the usual blocks and bale ties may be employed and that the press will be equipped with the usual stops to resist back pressure of the compressed material.

Springs 16 are secured to the side walls of the press to engage the compressed hay and prevent it expanding back into the feed chamber on the rebound of the plunger or presser block. The baling box will be at least long enough to accommodate two bales so that it will not be necessary to suspend the operation of the press while tying a bale. Tension bolts 17 are secured rigidly at their lower ends to the sides of the press and have their upper ends projected through cross bars 18 on top of the press and equipped with nuts 19 bearing against said cross bars. By properly adjusting the nuts, the tension or pressure put upon the hay in the baling box may be easily regulated.

The sills 1 are extended beyond the feed-end of the bale box 2, as shown clearly in the drawings, and near the outer extremities of the extended portions of the sills, I erect standards 5 which are connected with the bale box by beams 6. A fulcrum pin or bolt 7 is inserted through the upper ends of the standards 5 and this fulcrum pin or bolt is reinforced by braces 8 which extend in an inclined position from the outer extremities of the sills to the bolt, as shown clearly in Fig. 1. The upper portions of these braces 8 are expanded laterally so that they will fit close to the sides of the operating lever 9 and thereby prevent lateral vibration of the lever, consequently holding the lever in one vertical plane so that the force exerted therethrough will be applied directly to the pitman which connects the lever with the plunger. It will be readily noted that the upper ends of these braces 8 completely inclose the fulcrum pin or bolt 7 between the standards 5 so that bending of said pin under strain imposed thereon during the operation of the press will be prevented. The lower end of the lever 9 is beveled, as indicated at 10, and just above the said beveled extremity of the lever, a pivot pin 11 connects it with the pitman 12, bushings 20 being fitted in the lever around the pin 11 and rod 7 to prevent excessive wear. The outer end of this pitman 12 is bifurcated, as shown at 13, and the lower extremity of the lever fits within the bifurcation. The inner or end wall of the bifurcation is tapered or beveled in converging planes, as shown at 14, thereby presenting stops which are engaged by the beveled extremity 10 of the lever at the opposite limits of its movement. The inner end of the pitman 12 is pivotally connected to the plunger or presser block 15 and it will be readily understood that when the lever is swung downwardly to the position shown in Fig. 2, the pitman and the plunger will be moved inwardly so as to force the material in front of the plunger into the baling chamber. When the lever is swung upwardly into the position shown in Fig. 1, the plunger will be withdrawn to permit the feeding of a fresh charge into the space in front of the plunger, as will be readily understood. It is to be noted that when the lever reaches the lower limit of its movement, which is when it is in a horizontal plane, as shown in Fig. 2, the beveled extremity 10 of the lever will engage the lower beveled surface or stop 14 of the pitman and further movement of the lever will be thereby arrested. When the lever is swung upwardly to the position shown in Fig. 1, the beveled extremity 10 thereof will swing clear of the pitman and the side of the lever will engage the upper surface or stop 14 of the pitman and, consequently, the outward movement of the plunger will be arrested. It will thus be seen that the plunger is arrested at the limit of its movement in each direction so that the pressure applied to the several charges of hay or other material will be uniform and jamming, with consequent breaking, of any of the parts will be prevented.

The plunger or presser block 15 is provided with notches 21 in its side edges whereby it may ride over the springs 4 and rollers or pins 22 project from the side edges of the block to slide in guides or ways 23 in the sides of the press. The block will thus be lifted from the floor and will run easily, reducing the strain on the pitman and the force required to run the press.

My improved press is exceedingly simple in the construction and arrangement of its parts and may be economically produced and operated.

Having thus described the invention, what is claimed as new is:

1. In a baling press, the combination of a supporting frame, a baling box thereon, a plunger working in the baling box, a lever fulcrumed upon the supporting frame, a pitman connecting the lever with the plunger, and stops adjacent the connection between the lever and the pitman to arrest the movement of the parts in either direction.

2. In a baling press, the combination of a supporting frame, a baling box thereon, a plunger moving in the baling box, a lever fulcrumed upon the supporting frame and having a beveled extremity, a pitman pivoted at one end to the plunger and at its opposite end to the lever near the beveled extremity thereof, and stops on the pitman adapted to be engaged by the beveled extremity of the lever.

3. In a baling press, the combination of a supporting frame, a baling box thereon, a plunger working in the baling box, a lever fulcrumed upon the supporting frame and having a beveled extremity, and a pitman pivoted at its inner end to the plunger and having its outer end bifurcated and fitted around and pivoted to the lever, the inner end wall of the bifurcation being tapered to be engaged by the beveled end of the lever and thereby limit the movement of the parts in both directions.

4. In a baling press, the combination of sills, a baling box mounted thereon, standards erected on the sills, beams connecting the upper ends of the standards with the baling box, a plunger working in the baling box, a pivot inserted through the upper ends of the standards, braces secured to the sills and fitting around the pivot between the standards, a lever fulcrumed on said pivot between said braces, and a pitman connecting the lever with the plunger.

In testimony whereof I affix my signature.

WILLIAM E. DEES. [L. S.]